Patented Nov. 30, 1937

2,100,378

UNITED STATES PATENT OFFICE 2,100,378

AZO DYES

James I. Carr and Crayton K. Black, Wilmington, Del., assignors to E. I. du Pont de Nemours & Company, Wilmington, Del., a corporation of Delaware No Drawing. Application September 7, 1935, Serial No. 39,630

19 Claims. (Cl. 260—86)

This invention relates to azo dyestuffs which have particular utility in the dyeing of rubber, and to processes of preparing them.

United States Patents 990,173, 1,076,819, 1,082,719 and 1,595,269 describe and claim dyes, involving a negatively-substituted amine diazotized and coupled to an aceto-acetarylamide, that are bright and fast to light but which migrate or bleed in rubber, and which, because they have considerable linseed-oil solubility are not satisfactory for use in paint and ink vehicles.

An object of this invention is to produce bright dyes fast to light, non-migrating in rubber, and suitable for use in oil or in vehicles for paints and printing inks. Another object of the invention is to make these dyes by processes which are economically and technically satisfactory. Yet another object is to produce two-toned rubber which does not exhibit bleeding at the boundaries of the color zones. Other objects of the invention will be in part apparent and in part more fully hereinafter set forth.

The objects of the invention are accomplished by a group of dyes consisting of a negatively substituted diazotized aromatic amine coupled to an aceto-acet-nitro-arylamide. Other objects of the invention are accomplished by the processes of making the colors which are more fully hereinafter described.

In the preferred form of the invention the first, or "diazo", component may be any negatively substituted arylamine or aryldiamine which does not contain a water-solubilizing group. By the term amine as used herein is intended any mono or diamine. Members of this class shown in the following examples are illustrative, not limitative, it being within the scope of the invention to use any diazotized primary arylamine or diazotized primary aryldiamine. The term aryl as herein used is intended to include those aromatic compounds having a multiple ring nucleus as well as those having a single ring. Examples of such compounds are mono- and di-amines of the benzene, naphthalene, anthracene, diphenyl, and carbazole series which have substituted in the aromatic nucleus a negative group, such as halogen or nitro. The negative substituent may occupy any unsubstituted position in the aryl nucleus. The aryl nucleus may be additionally substituted by non-water-solubilizing groups of the type alkyl, alkoxy, aryloxy, aralkyl, aralkoxy, aryl, and trifluoroalkyl.

The diazo components are coupled, according to our invention, to a coupling component which is an aceto-acetarylamide substituted in the aryl nucleus by one or more nitro groups, and which is free of water-solubilizing substituents. Aceto-acetarylamides of the benzene and naphthalene series are preferred, but arylamides of the anthracene and diphenyl and carbazole series may be used. The nitro group may occupy any unsubstituted position in the aryl nucleus. The aryl nucleus may be additionally substituted by any of the groups alkyl, alkoxy, aryloxy, aralkyl, aralkoxy, aryl, and trifluoroalkyl.

The following examples in which parts are by weight are illustrative, not limitative, of the invention:

Example I 15.2 parts of 3-nitro-4-amino-toluene were mixed with 120 parts of water containing 8 parts of 100% hydrochloric acid, and were diazotized, in the usual manner, by adding 6.9 parts of sodium nitrite. 23 parts of aceto acet-p-nitro-anilide were dissolved in 250 parts of water containing 4.3 parts of sodium hydroxide, 20 parts of sodium acetate were added, and the solution was made acid to blue litmus paper by adding 100% hydrochloric acid, 3.85 parts being required. The temperature was adjusted to 20° C., the diazotized 3-nitro-4-amino-toluene was admixed at a rate which showed no test for diazo body at any time, thirty minutes being required to complete the admixture, a dye precipitated, was isolated by filtration, washed acid free, and dried.

The dye was a bright yellow powder which dissolved in concentrated sulfuric acid to give a reddish-yellow solution, and which, when milled into crepe rubber, imparted a bright, greenish-yellow shade that did not migrate into adjacent white rubber.

Example II 23 parts of aceto acet-m-nitroanilide were substituted for the aceto acet-p-nitroanilide in Example I, the dye was a bright, yellow powder which produced an orange colored solution when dissolved in concentrated sulfuric acid, and when milled into crepe rubber imparted a bright, greenish-yellow color that did not migrate into adjacent white rubber.

Example III 25 parts of aceto acet-2-nitro-4-methyl anilide were substituted for the 23 parts of aceto-acet-p-nitroanilide in Example I, producing a reddish-orange dye which dissolved in concentrated sulfuric acid, producing a red solution.

Example IV 27 parts of acetoacet-4-chlor-2-nitroanilide was substituted for the 23 parts of acetoacet-p-nitroanilide in Example I, producing a dye of orange color which dissolved in concentrated sulfuric acid, producing a greenish-yellow solution.

Example V 16.8 parts of 3-nitro-4-amino anisole was substituted for the 15.2 parts of 3-nitro-4-amino-toluene of Example I. The resulting dye was a bright, yellowish-orange powder much redder in shade than the dye from Example I. It dissolved in concentrated sulfuric acid, producing an orange colored solution. It was non-migrating in rubber.

Example VI 20.25 parts of 6-chlor-3-nitro-4-amino-anisole were substituted for the 15.2 parts of 3-nitro-4-amino-toluene in Example I, producing a bright, yellow powder redder in shade than the dye of Example I and greener in shade than the dye of Example V. It dissolved in concentrated sulfuric acid, producing a reddish-yellow solution.

Example VII 18.2 parts of 3-nitro-4-amino-phenetole were substituted for the 15.2 parts of 3-nitro-4-amino-toluene in Example I, producing a dye redder than the dye of Example VI but greener than the dye of Example V. It dissolved in concentrated sulfuric acid, producing an orange colored solution.

Example VIII 22 parts of 3,3'-dibrom-benzidine sulfate were tetrazotized with 12 parts sulfuric acid and 6.9 parts of sodium nitrite in the usual manner, and were coupled to acetoacet-p-nitroanilide as in Example I, producing a dye of orange color which dissolved in concentrated sulfuric acid to give a red solution.

Example IX 17.65 parts of 3,3'-dichlor-benzidine sulfate were substituted for the 22 parts of dibrom-benzidine in Example VIII, producing a dye of orange color which dissolved in concentrated sulfuric acid to give a reddish orange solution.

Example X 12.75 parts of o-chloraniline were substituted for the 15.2 parts of 3-nitro-4-amino-toluene in Example I, producing a dye of bright, very greenish-yellow color which dissolved in concentrated sulfuric acid to give a yellow solution.

An advantage of this invention lies in the surprising fact that this group of dyes does not bleed when used to dye rubber. This advantageous quality is not found in the dyes of this type which were previously disclosed in the patents hereinabove referred to. Another advantage of the invention is the applicability of these dyes to the manufacture of colors and printing inks having an oil base. Another advantage of the dyes is their compatibility with oils. Other advantages of the invention reside in the method of producing the dyes. Yet other advantages will be apparent to persons skilled in the art.

As many apparently widely different embodiments of this invention may be made without departing from the spirit and scope thereof, it is to be understood that we do not limit ourselves to the specific embodiments thereof except as defined in the appended claims.

We claim:

1. A dyestuff being the product formed by diazotizing an arylamine, free from water-solubilizing substituents, having the formula

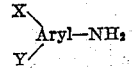

in which X is one of a group consisting of H and NH₂ and Y is one or more of the group consisting of halogen and nitro, and coupling it to an aceto-acet-nitro-arylamide free from water-solubilizing substituents, said coupling component containing only one aryl nucleus.

2. A dyestuff being the product formed by diazotizing an arylamine, free from water-solubilizing substituents, having the formula

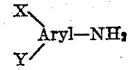

in which X is one of a group consisting of H and NH₂ and Y is one or more negative substituents other than water-solubilizing substituents, and coupling it to an aceto-acet-nitro-anilide free from water-solubilizing substituents, said coupling component containing only one aryl nucleus.

3. A dyestuff being the product formed by diazotizing an arylamine free from water-solubilizing substituents having the formula

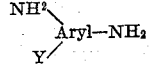

in which Y is a negative substituent other than a water-solubilizing substituent, and coupling it to an aceto-acet-nitro-arylamide free from water-solubilizing substituents, said coupling component containing only one aryl nucleus.

4. A dyestuff being the product formed by diazotizing an arylamine free from water-solubilizing substituents having the formula:

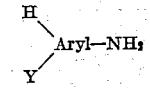

in which Y is a negative substituent other than a water-solubilizing substituent, and coupling it to an aceto-acet-nitro-arylamide free from water-solubilizing substituents, said coupling component containing only one aryl nucleus.

5. A dyestuff being the product formed by diazotizing an aniline, free from water-solubilizing substituents, having the formula:

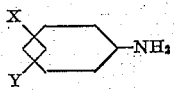

in which X is one of a group consisting of H and NH₂ and Y is one of a group consisting of chlorine and nitro, and coupling it to an aceto-acet-nitro-arylamide free from water-solubilizing substituents, said coupling component containing only one aryl nucleus.

6. The process which comprises mixing 15.2 parts of 3-nitro-4-amino-toluene with 120 parts of water containing 8 parts of hydrochloric acid, adding 6.9 parts of sodium nitrite, and mixing the diazotized solution at a rate that shows no test for diazo body with a solution made acid to litmus by the addition of hydrochloric acid containing 23 parts aceto acet-p-nitroanilide, 250 parts water, 4.3 parts sodium hydroxide, and 20 parts sodium acetate at a temperature of 20° C. and isolating the dye.

7. The process which comprises coupling diazotized 3-nitro-4-amino toluene with aceto acet-p-nitroanilide.

8. The process which comprises coupling a negatively substituted diazotized arylamine without a water-solubilizing substituent to an aceto-acet-anilide substituted in the aryl nucleus by at least one nitro group and without water-solubilizing substituents, said coupling component containing only one aryl nucleus.

9. The process which comprises coupling a negatively substituted diazotized aryldiamine without a water-solubilizing substituent to an aceto-acet-anilide substituted in the aryl nucleus by at least one nitro group and without a water-solubilizing substituent, said coupling component containing only one aryl nucleus.

10. The process which comprises coupling a negatively substituted diazotized aryl monoamine without a water-solubilizing substituent to an aceto-acet-anilide substituted in the aryl nucleus by at least one nitro group and without a water-solubilizing substituent, said coupling component containing only one aryl nucleus.

11. A compound represented by the formula:

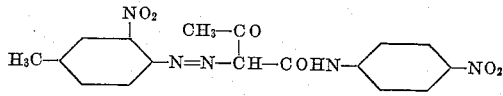

12. A compound represented by the formula:

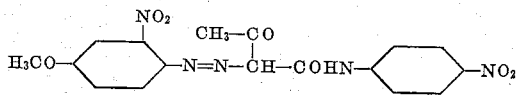

13. A compound represented by the formula:

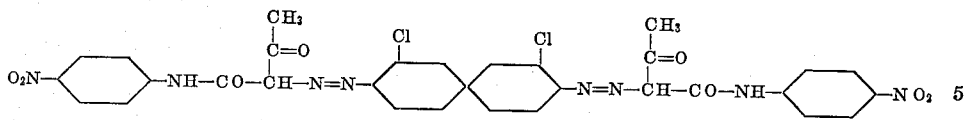

14. The process which comprises diazotizing 3-nitro-4-amino-anisole, dissolving aceto-acet-paranitroanilide in alkaline water, adding sodium acetate, acidifying, bringing the temperature of the mixture to about 20° C., admixing the diazotized body at a rate which shows no test for diazo, and isolating the color.

15. The process which comprises mixing a water solution of diazotized 3-nitro-4-amino-anisole with an acidified water solution of aceto-acet-para-nitroanilide-sodium salt and isolating the product.

16. The step in the process of producing a color which consists in coupling diazotized 3-nitro-4-amino-anisole to aceto-acet-para-nitroanilide.

17. The process which comprises tetrazotizing 3:3'-dichlor-benzidine sulfate, dissolving aceto-acet-para-nitroanilide in alkaline water, adding sodium acetate, acidifying, bringing the temperature of the mixture to about 20° C., admixing the diazotized body at a rate which shows no test for diazo, and isolating the color.

18. The process which comprises mixing a water solution of tetrazotized 3:3'-dichlor-benzidine sulfate with an acidified water solution of aceto-acet-para-nitroanilide-sodium salt and isolating the product.

19. The step in the process of producing a color which consists in coupling tetrazotized 3:3'-dichlor-benzidine sulfate to aceto-acet-para-nitroanilide.

JAMES I. CARR.
CRAYTON K. BLACK.